April 24, 1934. F. J. RAYBOULD 1,955,831
CONNECTER
Filed Sept. 3, 1931
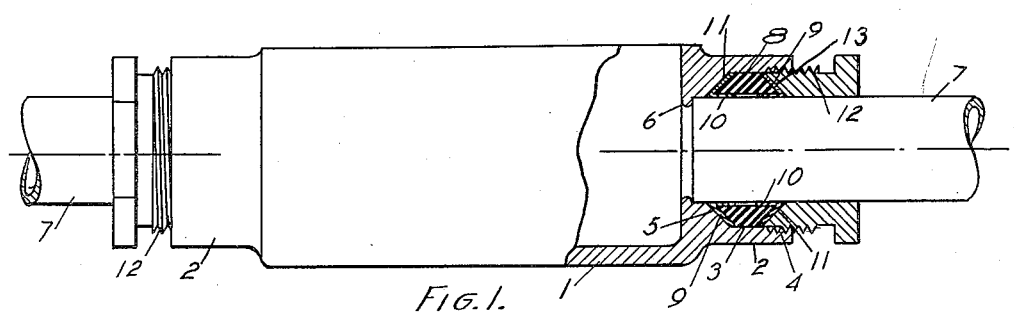
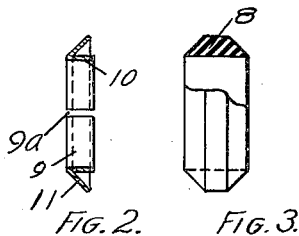
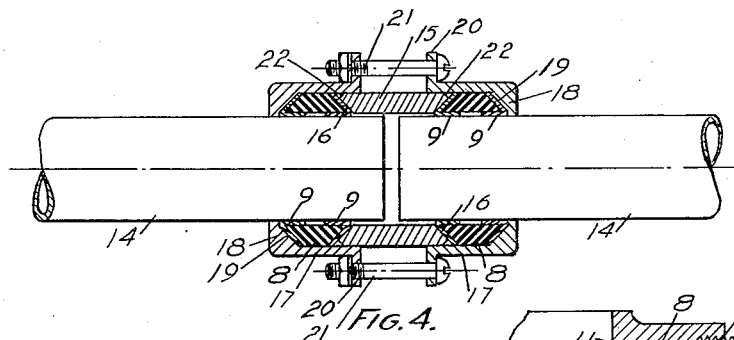
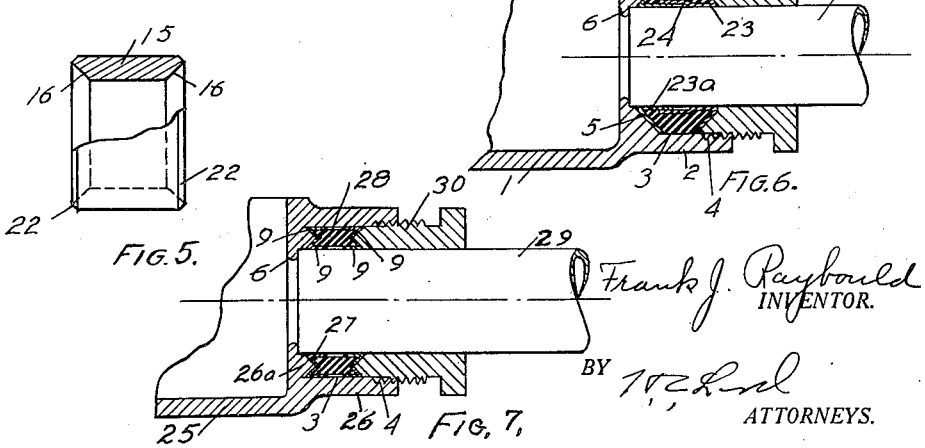
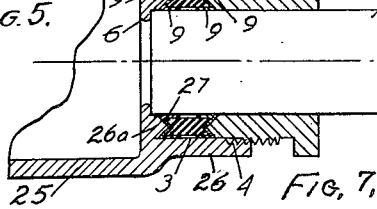

Patented Apr. 24, 1934

1,955,831

UNITED STATES PATENT OFFICE 1,955,831

CONNECTER

Frank J. Raybould, Erie, Pa.

Application September 3, 1931, Serial No. 560,992

4 Claims. (Cl. 285—166)

The present invention is designed to improve connecters, particularly connecters securing the connected parts in the absence of screw threads, or positive interlocking parts. It is especially advantageous in relation to conduit, or pipe connections, and as exemplified is so shown.

The invention in some ways is an improvement of the invention illustrated in my application, Serial Number 498,419, filed Nov. 26th, 1930. In that application a structure is shown in which there is an outer and inner member with a locking member arranged between these members comprising a distortable bushing with flanged contractible clamping bands at the end of the bushing, the locking means being confined in a gland with means for compressing it axially and expanding it radially to clamp the bands against the walls of the members. The end walls of the contractible bands in that structure are shown at right angles to the cylindrical parts of the band and when the band is subjected to the action of the distortable material there is a tendency to so clamp the end flanges as to prevent its ready contraction and as a result as the cylindrical portion is contracted there is a tendency to break, or shear off the flanged ends of the structure. The present invention is designed to obviate this difficulty and involves the use of clamping bands having the end walls, or flanges beveled, or inclined relatively to the cylindrical portion so that as it is compresed against the end walls it is forced radially with the cylindrical portion so as to prevent the shearing action and the wedging action also assists in the clamping action. Further features and details of the invention will appear from the specification and claims.

A preferred embodiment of the invention is illustrated in the accompanying drawing as follows:—

Fig. 1 shows a side elevation, partly in section, of a conduit box.

Fig. 2 a central section through one of the contracting bands.

Fig. 3 a side elevation, partly in section of the distortable bushing.

Fig. 4 a sectional view of a coupling.

Fig. 5 an elevation, partly in section, of a seating ring shown in the coupling.

Fig. 6 a section of an alternative structure of clamping band.

Fig. 7 a central section, of an alternative form of connecter locking bushing.

1 marks the conduit box. This has an extension 2 with a conduit-receiving cavity 3. The outer end of the extension has an internal screw thread 4 and it is provided with a beveled seating wall 5 at its inner end and is also provided with a guard 6 which engages the end of an inserted conduit 7.

The locking member comprises a distortable bushing 8 and contractible bands 9. The contractible bands have cylindrical portions 10 engaging the conduit and flanged ends 11, these flanged ends being beveled. The bands are split at 9a, the ends of the bands being slightly separated so as to permit of free clamping action on the conduit. One of these flanged ends engages the seat 5 and the other engages a seat 13 at the end of a pressure screw 12.

In the coupling shown in Fig. 4, conduits 14—14 are arranged end to end. A seating ring 15 is arranged around the ends of the conduit. This seating ring has beveled ends 16. Coupling rings 17 have flanged ends 18 with beveled seats 19 engaging the outer ends of the clamping members 8. The coupling rings have flanges 20 and bolts 21 extend between these flanges so that the coupling rings may be drawn together and in consequence axial pressure is put upon the bushings of the clamping members 8, thus expanding them radially and converting the axial pressure into radial pressure clamping the metallic contractible bands against the conduits 14. I prefer to chamfer the ring 15 at 22 as any overflow rubber may pass into this small space and thus form a more effective seal.

It has been found that the interposition of the contractible metallic bands forced into engagement with the wall of the connected member by a distortable bushing gives to the connection a much greater resistance against separation than is possible with the distortable material, such as rubber alone and it is, therefore, desirable so far as the resistance to separation is concerned to have as little of the rubber surface in engagement with the clamped member as practical.

In the structure shown in Fig. 6, one of the bands 23 has its inner end slightly off-set at 24 so as to telescope the cylindrical portion of the companion band 23a.

In the alternative construction shown in Fig. 7 a fitting 25 has an extension 26 with an inner shoulder 26a. This shoulder has a V-shaped seat 27. The clamping member has a bushing 28 with V-shaped grooves at its ends. Two sets of split clamping bands 9 are provided, one engaging the outer walls of the V-shaped grooves and the other engaging the inner walls of the V-shaped grooves. A conduit 29 is engaged by the inner clamping bands as the clamping member is compressed by a screw thread 30 arranged in the end of the extension. This structure is of advantage where the variations in type, or conduit sizes are large and a greater radial take-up is desired than would be obtained with the thinner walled bushing.

It will be understood that this connection is available for different classes of use, as for instance, electrical conduits, but is particularly desirable for conduits subjected to high pressures such as high pressure gas lines.

What I claim as new is:—

1. In a connecter, the combination of two members to be connected, one of which is tubular and the other an inner member; a locking member between said tubular and inner members comprising a bushing of distortable material and contractible telescoping bands, each having a flanged end engaging the ends of the bushing; and means confining and exerting end pressure on the locking member to expand it radially and exert clamping pressure upon the bands.

2. In a connecter, the combination of two members to be connected, one of which is tubular and the other an inner member; a locking member between said tubular and inner members comprising a bushing of distortable material and contractible telescoping bands, each having a beveled flanged end engaging the ends of the bushing; and means confining and exerting end pressure on the locking member to expand it radially and exert clamping pressure upon the bands.

3. In a connecter, the combination of two members to be connected, one of which is tubular and the other of which is an inner member, said members having a space between them; a clamping member comprising a bushing of distortable material and contractible split bands on the inner and outer periphery of the bushing each having end flanges engaging the bushing; and means for confining and exerting pressure axially on the clamping member.

4. In a connecter, the combination of two members to be connected, one of which is tubular and the other of which is an inner member, said members having a space between them; a clamping member comprising a bushing of distortable material and contractible split bands on the inner and outer periphery of the bushing each having beveled end flanges engaging the bushing; and means confining and exerting pressure axially on the clamping member.

FRANK J. RAYBOULD.